United States Patent Office 3,576,604
Patented Apr. 27, 1971

3,576,604
METHOD OF HEAT DETECTION
Peter R. Hammond, China Lake, Calif., assignor to the United States of America as represented by the Secretary of the Navy
No Drawing. Filed Mar. 6, 1969, Ser. No. 805,006
Int. Cl. C09d 11/00; C09k 3/00, 11/12
U.S. Cl. 23—230                       3 Claims

ABSTRACT OF THE DISCLOSURE

A method for detecting heat effects which comprises applying to a unit affected by heat a mixture of weakly interacting acceptor-donor chemicals which show sharp color changes at specific temperatures.

GOVERNMENT INTEREST

The invention described herein may be manufactured and used by or for the Government of the United States of America for governmental purposes without the payment of any royalties thereon or therefore.

BACKGROUND OF THE INVENTION

The present invention relates to a new and improved method for detecting heat effects.

Color change type indicators have been known for many years. Their use in indicating temperature change are most generally not reversible. Once a temperature is reached and a color change is effected, it will not change back to the original color when the temperature condition is varied and often the color changes are not sharp so that the condition is not easily detected. Crayons have been used, but they smear above certain temperatures and the marks are not reuseable. Cholesteric liquid crystals have been reportedly usel to measure temperatures of microelectronic components. Apparently these crystals selectively scatter incident white light into bright colors as a function of temperature. In the present method of heat detection a mixture of chemicals is used which responds repeatedly to overheating. The materials are comparatively inexpensive, simple to apply, and can be used indefinitely.

SUMMARY OF THE INVENTION

The present invention relates to heat indicators, and more specifically to a method for detecting heat effects by use of mixtures of chemicals capable of effecting sharp color changes at specific temperatures.

It is the general object of this invention to provide a method of detecting hot spots in microelectric components mounted in small areas which are too small, inaccessible for fragile to permit use of conventional detection methods. Another object is to provide a method for detecting heat effects which is economical and responds repeatedly to overheating without damage. The invention provides a method for detecting heat effects at various temperatures in almost any desired color at which the mixtures of pairs of chemicals are stable.

BRIEF DESCRIPTION OF THE INVENTION

The instant invention is based upon a discovery of the indicator properties of certain mixtures of pairs of acceptor and donor chemicals which show color change upon heating. The color remains until the heat is diminished then the color vanishes. The mixture remains unchanged and can be repeatedly uhsed without loss of its color change property. Electronic circuits can be painted with a group of these mixtures of acceptor-donor chemicals and hot spots can be quickly and easily detected in areas inaccessible by ordinary heat indicators.

More specifically, the coating which is painted or sprayed onto the unit was prepared by mixing together in about equal amounts the chemicals (herein called acceptor and donor chemicals) in a compatible solvent such as tetrahydrofuran, dichloromethane or similar solvents. The acceptor and donor chemicals may also be mixed together without a solvent. At room temperature the mixtures stay in solution and are brushed or painted onto the unit which is allowed to dry. When the unit heats to certain temperatures the mixture changes color. For example, when a unit coated with a mixture of pairs of acceptor-donor chemicals such as diphenylamine and p-dinitrobenzene, reached 40° C. the white coating changed to an orange-red which remained until the temperature dropped to below 40° C.

The following table lists those mixtures of chemicals which show distinct color change. The approximate color transition temperature is also given.

TABLE.—COLOR CHANGES OF SOME OF THE MIXTURES OF ACCEPTOR-DONOR PAIRS OF CHEMICALS

| Donor | Acceptor | Solution color | Solid color | Approximate color-transition temperature, °C. |
|---|---|---|---|---|
| Diphenylamine | p-dinitrobenzene | Orange-red | White | 40 |
| Do | p-chloranil | Blue | do | 45 |
| Do | p-chloronitrobenzene | Orange | do | 27 |
| Triphenylamine | p-dinitrobenzene | Red | do | 119 |
| Do | 1,3,5-trinitrobenzene | do | Very pale pink | 96 |
| Do | p-chloranil | Blue-green | Pale cream | 104 |
| Tetramethyl-2-tetrazene | p-dinitrobenzene | Orange | White | −27 |
| Tetrakis(dimethylamino)ethylene | p-nitroanisole | Red | do | −33 |
| Do | Nitrobenzene | Magenta | do | −45 |
| Do | p-chloronitrobenzene | Violet | do | −35 |
| Do | Acridine | Red | do | −33 |
| Do | Hexafluorobenzene | Orange-red | Very pale cream | −38 |
| Do | Hexachlorobenzene | Red | White | −30 |
| Tetramethyl-2-thiourea | 1,3,5-trinitrobenzene | Orange | Very pale cream | 51 |
| p-Di-t-butylbenzene | Tetracyanoethylene | Orange-red | White | 65 |
| Tri-t-butylbenzene | do | do | do | 67 |
| Tetra-i-propylbenzene | do | Violet | do | 105 |
| Hexamethylbenzene | Tetranitromethane | Orange-red | do | −10 |
| Naphthalene | do | Yellow-orange | do | −10 |
| N,N-dimethylanile | Trinitromesitylene | do | do | −7 |
| Anthracene | do | Yellow | White | 186 |
| Pyrene | Hexanitrodiphenyl | Red | Pale cream | 126 |
| Anthracene | do | Magenta | White | 185 |

In all cases the color changes shown in the above table were distinct. The physical condition essential for the loss of color is a reduction in temperature. No chemical reaction takes place and the coating compound repeatedly responds to temperature change by showing color which it loses upon heat loss. The loss of color is seen to be the separation of the acceptor and donor molecules in the solid. The proportion of acceptor and donor molecules in contact, and hence capable of contributing to the absorption intensity, are the relatively few at crystal intersurfaces. Melting point diagram and X-ray crystals studies confirm the lack of compound formation of these specific compounds.

I claim:
1. A method for detecting heat effects in a unit affected by temperatures ranging from about −45° C. to about 186° C. which comprises coating said unit with a thin layer of a mixture in solution of pairs of weakly interacting acceptor-donor chemicals;

drying said coating until the color of said solution vanishes;

heating said unit; and noting any color change;

said mixture being selected from the following pairs of eccepter-donor chemicals consisting of diphenylamine - p-dinitrobenzene; diphenylamine-p-chloranil; diphenylamine-p-chloronitrobenzene; triphenylamine-p-dinitrobenzene; triphenylamine - 1,3,5-trinitrobenzene; triphenylamine - p-chloranil; tetramethyl - 2-tetrazene-p-dinitrobenzene; tetrakis(dimethylamino) ethylene - p - nitroanisole; tetrakis(dimethylamino) ethylene - nitrobenzene; tetrakis(dimethylamino) ethylene - p - chloronitrobenzene; tetrakis(dimethylamino)ethylene - acridine; tetrakis(dimethylamino) ethylene - hexafluorobenzene; tetrakis(dimethylamino)ethylene - hexachlorobenzene; tetramethyl-2-thiourea - 1,3,5 - trinitrobenzene; p-di-t-butylbenzene-tetracyanoethylene; tri - t - butylbenzene-tetracyanoethylene; tetra-i-propylbenzene - tetracyanoethylene; hexamethylbenzene - tetranitromethane; naphthalene-tetranitromethane; N,N - dimethylanile - trinitromesitylene; anthracene - trinitromesitylene; pyrene-hexanitrodiphenyl; anthracene-hexanitrodiphenyl.

2. The method in accordance with claim 1 wherein the pairs of acceptor-donor chemicals are mixed in about equal parts.

3. The method in accordance with claim 1 wherein the pairs of donor-acceptor chemicals are mixed in a compatible solvent.

References Cited

UNITED STATES PATENTS 2,798,855   7/1957   Hainsworth _____ 252—408
3,076,707   2/1963   Lawton et al. _____ 252—408X MORRIS O. WOLK, Primary Examiner R. M. REESE, Assistant Examiner U.S. Cl. X.R.

73—356; 106—21; 116—114.5; 252—408